United States Patent [19]

Petersson

[11] 4,312,077
[45] Jan. 26, 1982

[54] METHOD OF FASTENING BUTTONS AND THE LIKE TO A TEXTILE MATERIAL AND AN APPARATUS FOR PRACTISING SUCH METHOD

[75] Inventor: Bengt O. Petersson, Kungsbacka, Sweden

[73] Assignee: Bengt Petersson New Products Investment AB, Askim, Sweden

[21] Appl. No.: 173,199

[22] PCT Filed: Mar. 13, 1979

[86] PCT No.: PCT/SE79/00055

§ 371 Date: Nov. 16, 1979

§ 102(e) Date: Nov. 8, 1979

[87] PCT Pub. No.: WO79/00777

PCT Pub. Date: Oct. 18, 1979

[30] Foreign Application Priority Data

Mar. 16, 1978 [SE] Sweden .................. 7803025
Nov. 17, 1978 [SE] Sweden .................. 7811869
Jan. 18, 1979 [SE] Sweden .................. 7900444
Mar. 5, 1979 [SE] Sweden .................. 7901967

[51] Int. Cl.³ ............... A44B 1/42; B23K 21/02
[52] U.S. Cl. .................... 2/265; 24/90 R; 24/90 C; 24/90 HA; 24/96; 156/73.1; 156/92; 156/160; 156/494; 156/562; 156/580.1
[58] Field of Search .............. 156/73.1, 73.5, 92, 156/580.1, 580.2, 562, 556, 494, 160, 221, 423; 24/90 C, 90 R, 90 HA, 96, 101 R; 2/265; 265/23; 85/37; 411/501

[56] References Cited

U.S. PATENT DOCUMENTS 3,208,331 9/1965 Scholl ..................... 85/37
3,416,196 12/1968 Mathison ................ 24/90 HA
3,462,803 8/1969 Horton .................. 156/73.1
3,483,611 12/1969 Balamuth et al. ........ 156/73.1
3,696,470 10/1972 Reynolds et al. ....... 24/90 HA

FOREIGN PATENT DOCUMENTS 1210405 2/1966 France ................... 24/90
1460145 12/1968 Fed. Rep. of Germany .
2109981 8/1975 Fed. Rep. of Germany .
1404528 5/1965 Fed. Rep. of Germany .
411427 11/1966 Switzerland .
1180383 2/1970 United Kingdom .
1299119 12/1972 United Kingdom .

Primary Examiner—Michael G. Wityshyn

[57] ABSTRACT

A method of fastening a button or the like to a garment such that the garment will be buttoned up after the fastening operation, wherein said button is composed of plastic and initially comprises a button head and a stem projecting from the button head, the stem having an outer end for piercing the garment and for deformation by ultrasonic vibration, a central section characterized by a substantially smooth profile, and an inner section flaring into the button head, the method comprising the steps of: providing a button hole in a first portion of the garment; placing said first garment portion in an overlying relation with a second portion of the garment; positioning said button such that the button head is disposed on the side of said first garment portion opposite to said second garment portion and such that the stem extends through the button hole and pierces at least partly through said second garment portion; and deforming the outer end of the stem by ultrasonic vibration thereof. A machine for practising the method is also disclosed.

8 Claims, 13 Drawing Figures

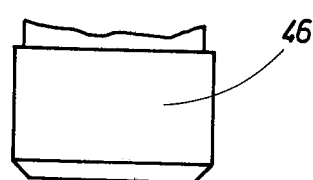
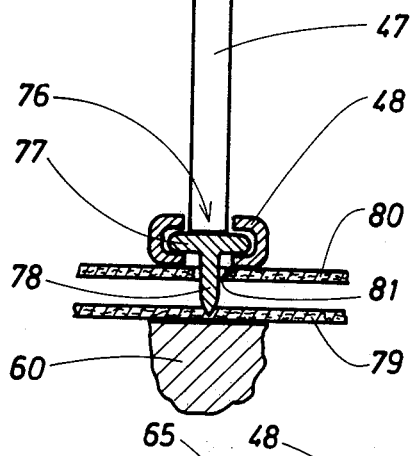
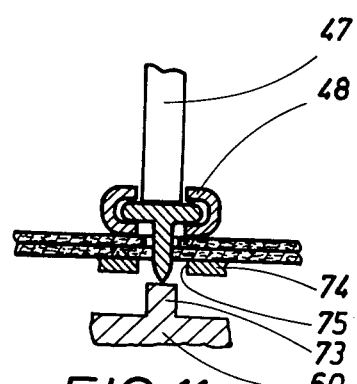
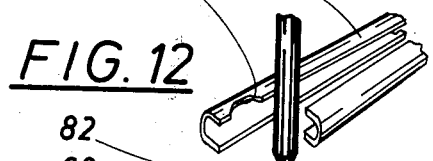
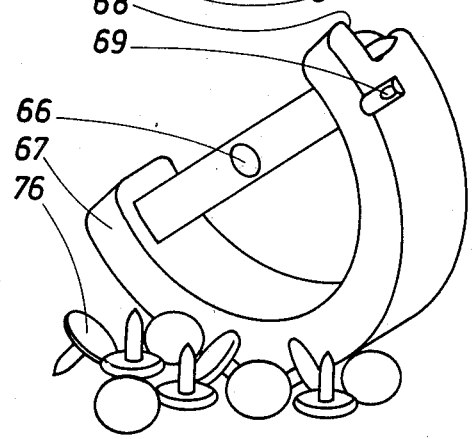
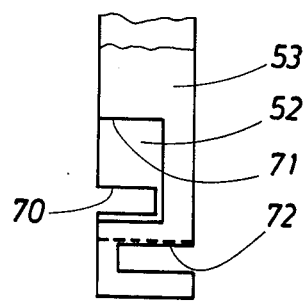

METHOD OF FASTENING BUTTONS AND THE LIKE TO A TEXTILE MATERIAL AND AN APPARATUS FOR PRACTISING SUCH METHOD

TECHNICAL FIELD

The present invention relates to a method of fastening elements such as buttons to a textile material, which element is formed of plastic and comprises a main body for positioning on one side of the textile and a deformable stem projection for piercing through the textile and for deforming into a deformation head on the other side of the textile. The invention also relates to an apparatus for carrying out the method.

BACKGROUND

The conventional method of fastening elements as for example buttons, hooks, eyes and the like to cloth or possibly plastic foil by sewing has many obvious drawbacks. Thus, the sewing operation is comparatively complicated and requires in modern serial manufacturing production almost unacceptably long working time. Also when sewing by hand, the fastening of buttons is a tedious and time consuming question. Many attempts have also been made to find ways of fastening buttons and similar elements other than by a sewing operation. Accordingly, it is known to make the button or the other element in two parts, which are joined by means of a stem extending through the cloth. A button of this kind is disclosed for example in U.S. Pat. No. 3,360,835.

However, in connection with buttons of this kind it is shown that it is difficult to obtain a rational and simple working process because of the difficulties of positioning the two parts of the button in the right position relative to each other on the two sides of the cloth. The means holding the two parts together also results in a drawback resulting in an expensive manufacturing cost and a limitation with respect to size and design. Buttons and objects of this known type therefore have only a limited application in the garment industry and only in connection with heavy garments such as work clothes.

In order to obtain a simpler and smaller button, it has as an alternative been suggested to design a button of plastic material provided with a stem, which is made to perforate the cloth and thereafter is deformed to a head. See for example the Swiss Pat. No. 411,427 or the British Pat. No. 1,229,119. As a method of deforming the stem, deformation by means of heat and mechanical pressure respectively has been suggested. However, when resorting to these methods of deformation, certain difficulties arise. Thus, in connection with deformation by heat there is a risk of overheating and consequently melting or transformation of the plastic material, so that ruptures will result. When plastics melt there is moreover the risk that it will adhere to the deformation tool and the head, which was supposed to be deformed, will not be completely formed. A mechanical deformation can cause the plastic material to be crushed so that the rivet head will be incomplete. It is also known that the "memory" of the plastics can result in the plastics part at least partially reverting to its original shape after some time.

Most garments are provided with a number of buttons, which are arranged in predetermined portions by way of example in connection with shirts, the buttons are arranged in a long row, and are intended to be buttoned up with a portion of the garment piece provided with button holes correspondingly arranged. In this connection the expression button holes does not comprise slits made in the cloth material only, but also for example eyes or loops protruding at a border, which sometimes are used.

Such a buttoning arrangement because of the work involved represents a considerable part of the price of the garment piece. The required work in addition to the button holes includes the fastening of the buttons in predetermined positions in a predetermined formation and the buttoning up of the garment piece, since articles of garment usually are delivered in buttoned up condition.

Technical problem

It is an object of the present invention to provide a method by means of which a button or the like, which can be designed as a single unit, can be fastened to a cloth or a foil after having been brought in contact with one side thereof, with a projection or a stem, which is deformed and which method does not exhibit the drawbacks mentioned in connection with the known methods previously described.

It is also an object of the invention to provide an apparatus for the fastening of buttons to pieces of garment in groups in a determined formation and in such a manner that the buttons will occupy a buttoned up position after the fastening procedure without any special buttoning up operation after the fastening operation.

It is another object of the invention to provide a button or corresponding element, which designed for use in connection with the method according to the invention.

THE SOLUTION

The objects of the invention are obtained by carrying out the method such that the forming of the deformation head is made by means of a tool subjected to oscillations in the ultrasonic range, pressed against the end of the projection of the button in such a way that the material of the same by yielding action forms the deformation head. Further, the projection in at least its inner portion, which occupies a position between the deformation head formed and the main portion of the object is provided with a smoothly developing profile without any abrupt sectional changes and with a rounded section flaring into the main portion.

According to a certain embodiment of the invention the buttons are fastened to a piece of garment in the formation desired for the finished piece of garment and such that the piece of garment will be buttoned up when the process is carried through.

The apparatus for carrying out the method comprises a holding device for the buttons in the intended formation, a device for stretching the portion of the piece of garment in which button openings are located and arranged to hold down the portion of the piece of garment provided with the button openings above the projections of the buttons in such a position that the projections extend through the button openings, a device for stretching the portion of the piece of garment where the buttons are to be fastened, a device which presses the stretched portion of the piece of garment where the buttons are to be fastened against the projections of the buttons extending through the button openings, so that the projections penetrate said portion of the piece of garment, and a device with one or several bodies which are coupled to a power means designed to transmit oscillations to the buttons in the ultrasonic range, which bodies are arranged to be pressed against the projections, so that the projection tips are deformed into widened heads thereby to attach the buttons.

BRIEF DESCRIPTION OF DRAWINGS

In the accompanying drawings the method will be apparent by showing the fastening of buttons, with the buttons shown in three different embodiments. In addition the means for carrying out the method is shown in one embodiment. The drawings thus show a button in its original form and in attached form and also an apparatus for the attachment of buttons, thus the means for the performance of the method is shown.

FIG. 10 is a partial cross sectional view of the machine shown in FIG. 8 and FIG. 9 showing a first fastening means fastening a button;

FIG. 11 is a view similar to that of FIG. 10 showing a second fastening means;

FIG. 12 is a perspective view of a button feeding element of the machine shown in FIG. 8 and FIG. 9; and FIG. 13 is a diagrammatic side view of a yoke for stretching a textile of the machine shown in FIG. 8 and FIG. 9.

BEST MODE OF CARRYING OUT THE INVENTION

Figure 1:
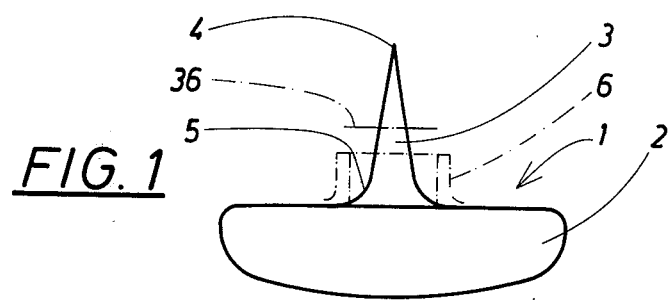
FIG. 1 is a side elevational view of an undeformed button according to a first embodiment of the invention.

As deformation means in connection with the present invention ultrasonic treatment is proposed. Ultrasonics have previously been used in order to join together details of plastics material. By the material being exposed to the ultrasonic oscillations a welding together of the surfaces of the material to each other is obtained. However, it has been shown that a deformation can be accomplished by pressing a vibrating tool against a plastics body. This method does not have the risk previously mentioned of melting and sticking. On the other hand, if the method is not carried out in the correct manner, there is a risk of the material being transformed in such a way that it exhibits cracks. However, if the ultrasonic treatment is carried out correctly, it yields can excellent result with good deformation of the material without any risk that it will revert to its original shape.

The method substantially provider that the button or any other suitable element is provided with a pointed extension or stem which is partly threaded through the textile material, whereafter the portion penetrating through the same is deformed. This will be made by pressing the tool against the point of the penetrating part at the same time as the main portion of the button or the other element is subjected to a counter-pressure from a comparatively large surface conforming to the shape of the button. The tool is fashioned of steel or other hard material and has its end shaped according to the desired shape of the deformation head. During the pressure operation the tool is subjected to ultrasonic oscillations of the frequency of 18,000–30,000 Hertz. The surface against which the main portion of the button or the element is resting must have said shape providing a great contact surface, since otherwise there will be a risk that the main portion will be deformed by the ultrasonic oscillations. Said surface for the counter-pressure must be made of a material which will not deform nor adhere to the object. Also in this regard a metallic material is preferable.

It has been found that the shape of the button and the object respectively is of great importance for the rational and correct application of the method. In this connection the shape of the stem is of essential importance.

Thus, it is shown that the following requisites as to the shape of the stem in connection with the invention should be fulfilled.

1. The stem should be provided with a point, so that it can perforate the textile material.

2. The stem should contain sufficient material in its outer portion intended to be deformed in order to a shape a sufficiently large deformation head.

3. The stem should exhibit such an increasing dimension and, if necessary, cutting edges, so that a penetration of the textile material by means of the stem to a desired depth of penetration results in a tearing off of threads of the textile material. This is not entirely necessary, especially not in connection with soft, fluffy materials, but it can quite considerably improve the holding property in connection with non-elastic, thin fabrics, as for example, fabrics for shirts.

4. The stem should not exhibit any abrupt changes of dimensions, at least not with regard to the inner portion, which is going to be deformed, but is intended to shape the portion which will hold the button on a certain distance from the cloth. Thus, the stem has to be made with a smooth connection to the main body of the object and must not exhibit cuts or reliefs.

Regarding the last mentioned point it is a known fact that a button and usually any other similar element should not be fastened tight to the textile material, but a "neck" has to be provided in order to give a certain movability of the object and to allow buttoning up the buttons. A material in which the button hole is made should have space to occupy a position between the button and the material to which the button is fastened. It is obvious to provide a spacer means against the textile material in order to secure an adjusted depth of penetration of the stem. Thereby it will be obvious to provide a shoulder on the stem or a flange projecting from the same. The button according to the previously mentioned British patent specification has a stem provided with a groove, in which the textile material penetrates. Thus the groove at its outside shows a widening conical section and a shoulder in the inwards direction towards the main part of the button. It is the purpose of the arrangement for the textile material to extend into the groove after it has passed the conical portion.

However, in connection with the invention it is shown that such abrupt changes in the sections of the stem can cause the risk of breakage. Thus, a shoulder as well as a cut will cause risks of cracks, which after some time of use lead to breakage. It is therefore important to avoid such abrupt changes of section and to find other methods of securing a suitable length of the "neck".

Figure 2:
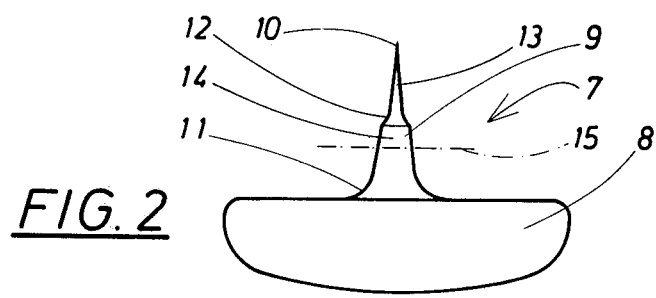
FIG. 2 is a side elevational view of an undeformed button according to a second embodiment of the invention.

These factors have been taken into consideration in connection with the buttons illustrated in FIGS. 1-4. Thus, a button 1 with a main portion 2 and a stem 3 is illustrated in FIG. 1. The stem 3 exhibits a point 4 succeeded by a conically widening section flaring into a portion exhibiting a radius 5 of relatively great dimension and constituting the main part 2. Thus the stem 3 is completely smooth and does not exhibit any spacer means for application against the cloth. If such a spacer means should be a desired feature, it shall be separated from the stem, for example shaped as a collar 6 which is separated from the stem 3 and which is depicted with dashed and dotted lines in the figure. A button 7 also with a main portion 8 and a stem 9 is shown in FIG. 2. The stem exhibits a point 10 and, at the connection to the main portion 8, a large radius 11. The stem has a conical shape but differs from the stem 3 in FIG. 1 in that it possesses a slightly flared section 12 from a narrow portion 13 to a portion 14 with larger diameter. However, the section 12 should not be located inside the position for the textile material after a deformation head is formed. This position is hinted by a dashed and dotted line 15 in FIG. 2.

Figures 3, 4:
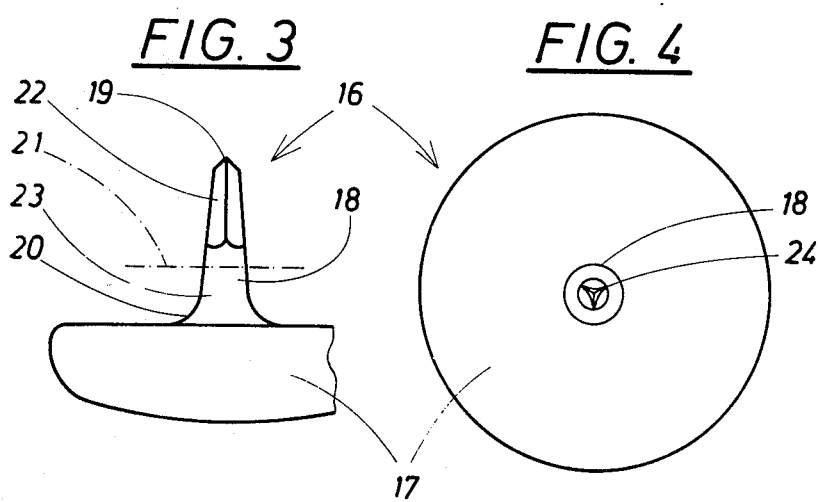
FIG. 3 is a partial side elevational view of an undeformed button according to a third embodiment of the invention.
FIG. 4 is a top view of the button shown in FIG. 3.

The button 16 illustrated in FIGS. 3 and 4 also exhibits a main portion 17 and a stem 18. The stem 18 is provided with a point 19 and, at the connection with the main portion 17, a large radius 20. The outer portion of the stem 18 is provided with a triangular portion 22 with cutting edges 24 just outside of the boundary 21, which is depicted with dashed and dotted lines and where the textile material should be positioned after the fastening of the button. Inside of the postion 22, the stem 18 is designed with a conical portion 23 of round cross-section.

The different examples of embodiments of the button should be made of a plastics, an acetaldehyde resin having proved to be a suitable material. Only buttons have been shown as examples. However, the main portion 2, 8 and 17 respectively can also by way of example be designed as a hook, an eye or a press fastener. The required design of the "neck" can then differ from the one previously indicated. However, this is of no great significance in the design of the stem. If a "neck" is not at all required, a spacer body lik the collar 6 can of course be omitted.

The method according to the invention comprises the following successive operations:

a. Application of the main portion of the button of the object against a tool of the previously mentioned design provided to exert a counterpressure.

b. When the textile material is firmly held in place, moving the point of the stem towards the textile so that the point penetrates the textile until the same is brought to the desired position on the stem (see the lines 15 and 21 in FIGS. 2 and 3, respectively).

c. Application of a tool subjected to ultrasonic oscillations against the point of the stem and application of a pressure until, because of the pressure and the oscillations, a head has been shaped on the side of the material facing away from the main portion. By this arrangement the button or the object is secured to the textile material.

The step b is of great interest. Assuming that the material is woven or knitted, its threads will be moved aside when the point penetrates the textile material, so that the stem can penetrate through the same. However, it has turned out that in connection with nonelastic hard fabrics such as shirt cloth and blouse cloth of cotton and/or synthetic material the penetration of the tapering stem also causes some thread to be torn off so that free ends of threads are formed on the side of the material facing the point of the stem. The tearing off of threads can be facilitated and the pressure for the penetration of the material can be reduced if the stem is given cutting properties as has been shown in FIGS. 3 and 4 where the cutting edges 23 of the portion 22 cause a direct severing cutting off of certain threads. In connection with non-elastic materials, such a design of the stem is as a rule not necessary, but it can be of advantage in connection with textile materials having more yield either because of a looser connection between the threads (for example obtained by knitting) or because of elastic and/or fluffy threads.

As a matter of fact the formation of free ends of the threads has turned out to be of great importance for the fastening operation. When using ultrasonics for the deformation, such a flow of the plastics material takes place that the threads penetrate into the deformed head and are fastened to the plastic material. If the deformation head only should form a body on the surface of the textile material, this body would fairly easily be drawn through the textile material by further widening of the hole, through which the stem extends. The risk of extraction of a button, which is not fastened by sewing, is in fact a principal problem in connection with such buttons. In the previously mentioned British patent, one can also observe that measures have been taken in order to pinch the textile material into a groove, whereby the button is fastened by both the deformation head and friction. However, also a fastening by friction has turned out to be of scant reliability, espically after the piece of garment has been used for some time, which has resulted in the threads around the hold having been worn or displaced due to movements between the button and the material. An additional drawback in connection with buttons with a free deformation head is the absence of something that impedes the neck from being pressed into the material, which can cause difficulties in connection with the buttoning up operation. Therefore, one must provide some kind of spacer element, which, according to the British patent, comprises a shoulder. However, this makes it necessary to dimension the neck with a big cross-section, which produces a less secure and also ugly buttoning, as the cloth near the button hole will wrinkle about the wide neck. The manner described involving the integration of threads of the textile material into the material of the deformation head therefore signifies a great improvement and a solution of a difficult problem in connection with "riveted" buttons.

This type of fastening is especially important in connection with fluffy cloth, which is not at all capable of resisting a penetration of the deformation head. As also a fastening by friction is not very reliable, one has had to abandon the use of buttons not fastened by sewing in connection with such materials. However, the present method can be adapted also to this case, such as by providing that one or several threads will be severed off by a suitable design of the stem, see by way of examples FIGS. 3 and 4 or such as by the use of the suggested deformation by means of ultrasonics by integrating projecting fibres of fluffy threads into the deformation head.

An important feature in connection with step b is also the formation of the best longitudinal dimension of the "neck", for the limited penetraton of the stem into the textile material. If this can take place by means of a spacer body, by means of example the collar 6 according to FIG. 1 or possibly a separate spacer element, the formation of a suitable length of the "neck" does not present any problems during the fastening operation itself apart from the fact that a loose distance element can cause problems. However, the collar mentioned or a loose part which widens the neck is inconvenient when buttoning up the button and must therefore be avoided. However, other solutions are available. Thus, an angle of the cone well adapted to the widening property of the material in connection with a certain force results in a certain penetration of the stem. When the stem is designed according to FIG. 2 and to some extent, when it is designed according to FIG. 3, a suddenly increased force of insertion is obtained by the passage from the narrow portion 13 and the triangular portion 22, respectively, which can give a fairly accentuated position 15 and 21, respectively for the textile material. It should be noted that the stem should penetrate so far that the rapid changes of dimension will not be in the non-deformed portion. Moreover, factors depending upon the time can be used in order to form a suitable length of the neck. Thus, a certain time is required for the penetration, and if the operation time is adjusted in the correct way an acceptable length of the neck can be obtained. The textile material can further be guided by way of example by means of a holder ring around the button position, on a certain distance from the main portion. Another method provides that the machine for performing the fastening operation is provided with spacer means, which are introduced between the main portion and the textile material and remain there during the fastening operation. However, it is important to see to it that these spacer means do not damage the button during the ultrasonic treatment.

Figure 5:
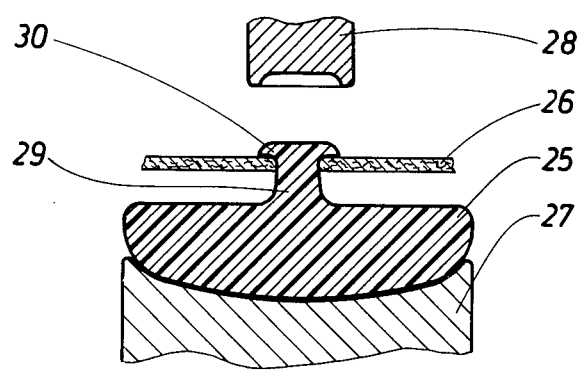
FIG. 5 is a cross-sectional view of the button according to the first embodiment in FIg. 1 in a fastened condition.

FIG. 5 illustrates a button 25 in fastened condition, with a textile material 26, a support tool 27, and a deformation tool 28. The button 25 is provided with a stem 29, of which a part has been formed into a deformation head 30 by pressure and treatment with ultrasonic oscillations by means of the tool 28. The original appearance of the stem can be according to what is shown in FIGS. 1, 2 and 3. The choice is strongly dependent upon the type of textile material that is used. Thus, the design according to FIG. 1 with a sharp point and an even flowing contour of the stem is well adapted for hard materials. FIG. 2 shows a design which is suitable in connection with somewhat looser material. Finally, the design according to FIG. 3 is suitable for still looser material.

Figure 6:
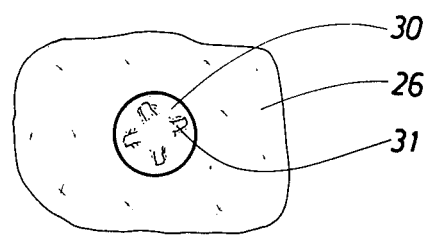
FIG. 6 is a top view of the fastened button shown in FIG. 5.

In FIG. 6 a top view of the deformation head 30 is shown, depicting a number of ends 31 of threads have been integrated into the deformation head 30.

Figure 7:
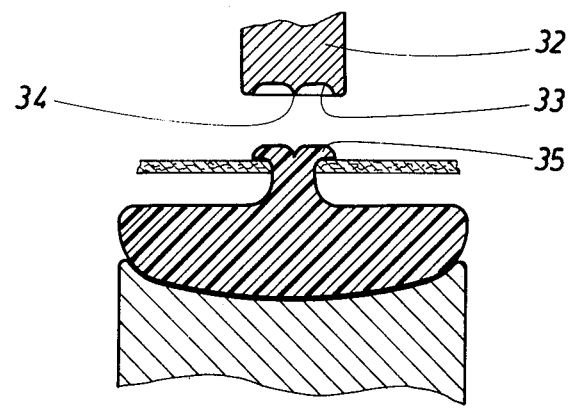
FIG. 7 is a cross-sectional view of the button according to the first embodiment shown in FIG. 1 in a fastened condition, using a fastening means different from that used in FIG. 5 and FIG. 6.

A somewhat different design of the deformation tool, indicated 32, is shown in FIG. 7. In this case the end surface of the tool has been designed as a recess 33 of toroidal shape with a point 34 in the middle. In this design the material can be more easily distributed in sidewise direction. This design is suitable in connection with plastics, which are difficult to bring to yield, or where one desires an especially large deformation head. The deformation head obtain the shape of the recess 33 of the tool, as shown by 35 in FIG. 7.

In using the tool according to FIG. 7, it is not suitable to have the stem end in a point. The method can however be modified using the button stem shape shown in FIG. 1, whereby the point 4 of the stem, after the penetration of the textile material, will be cut off in a tool which works in the same machine in which the fastening operation takes place. A cutting surface is thereby obtained, which by way of example, is level to the line 36 in FIG. 1. As is easily understood, it is not suitable to shape the stem initially with such a blunt surface because difficulties will then arise in connection with the penetration of the textile material.

Figure 8:
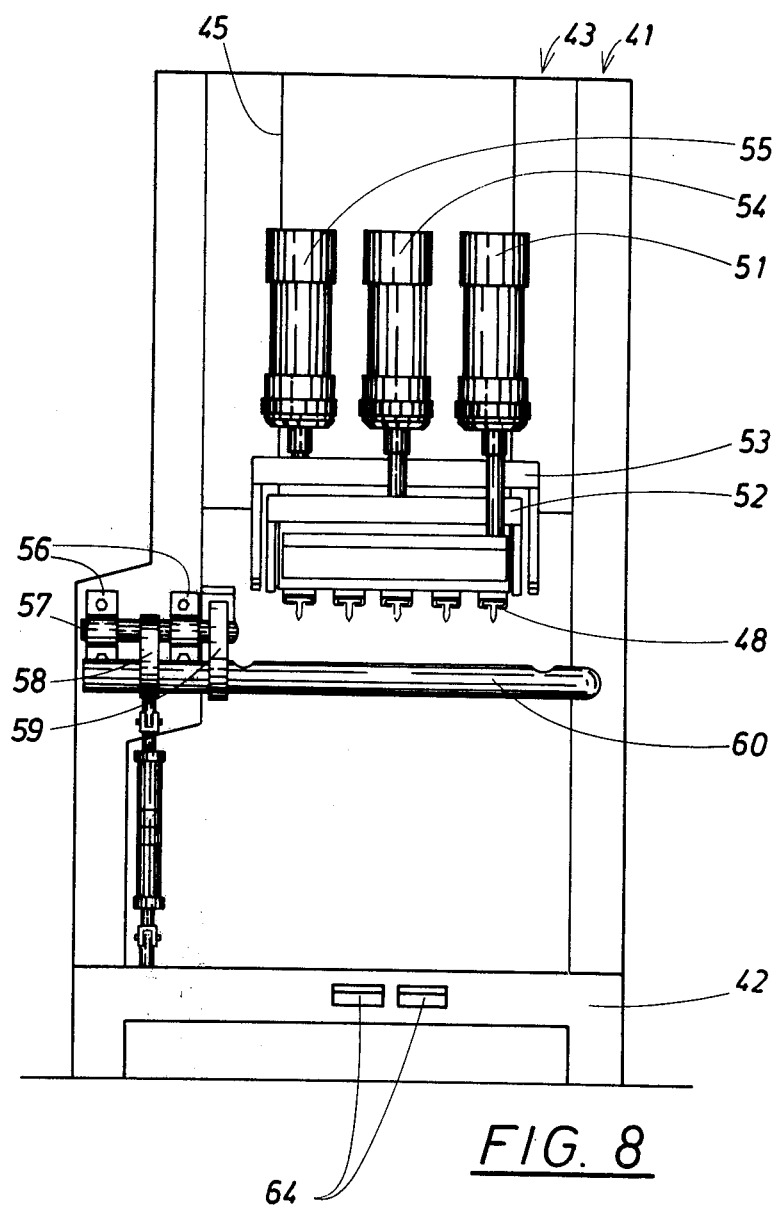
FIG. 8 is a front view of a machine according to the present invention.
Figure 9:
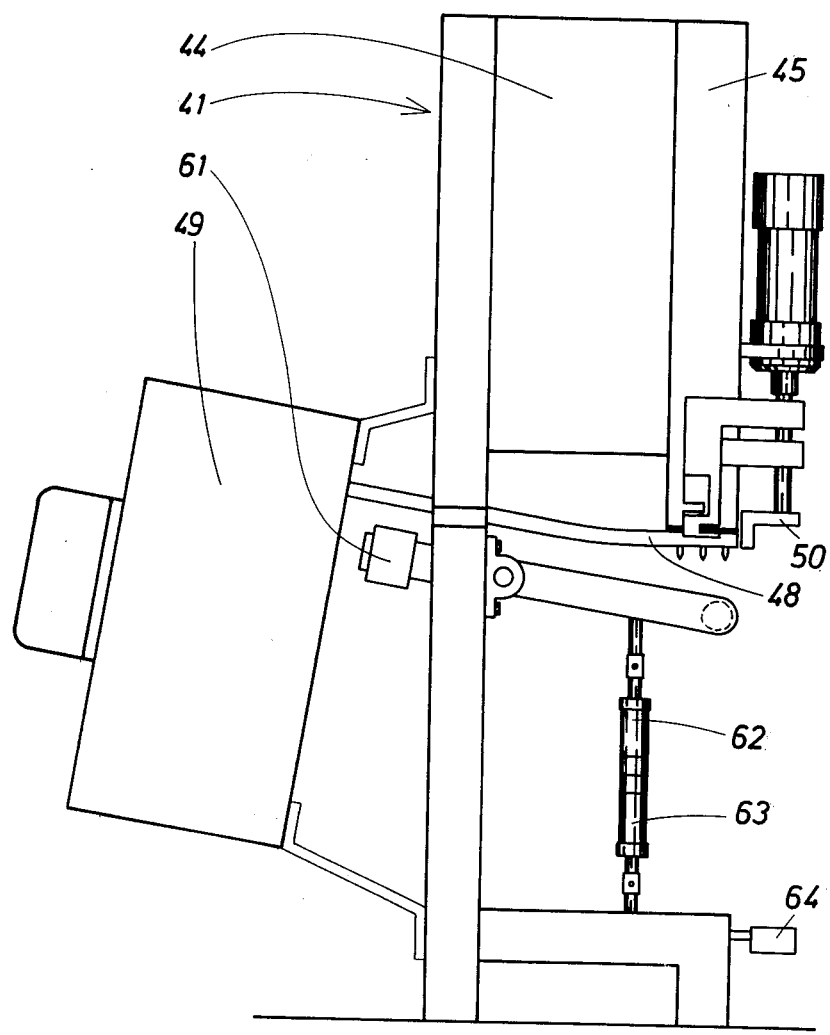
FIG. 9 is a side elevational view of the machine shown in FIG. 8.

According to FIGS. 8 and 9 the apparatus according to the invention includes with a footing 42. A housing 43 is suspended in the frame, said housing comprising a box 44 containing an ultrasonics generator, such as an electric generator producing an alternating voltage within the ultrasonic range of 18,000–30,000 Hertz, and a covered rack 45 for the mechanical portion of the ultrasonic generator. The mechanical portion comprises a number of magnetic devices 46 (partly illustrated in FIGS. 10, 11) with bodies 47 which are put into vibration within said range of frequency by means of a magnetic device.

To the underside of the rack 45 protruding below the housing 44 five profiled rods 48 have been attached. These rods emerge from an open end at the front of the rack 45 and terminate behind the frame 41 in a feeding device 49, which will be described later. A stop plate 50, which can be operated by means of a preferably pneumatic power cylinder 51, can be lowered down in front of the open ends of the rods 48. Two yokes, an inner one 52 and an outer one 53, extend along the front side of the rack 45 and around to its lateral sides. The two yokes 52 and 53 can be displaced in a vertical direction by means of power cylinders 54 and 55 respectively. At the lower edge of its lateral pieces the yokes 52 and 53 are provided with grooves.

A shaft 57 is journalled in the frame 41 by means of two bearing brackets and supports two arms 58 and 59. These arms at their extreme ends support a bar 60. The arm 59 is double-sided and at its rear end supports a counterweight 61. Two power cylinder 62 and 63 coupled in series with each other extend between the arm 58 and the foot 42 of the frame 41.

The different parts are arranged in such a manner that a magnetic device coupled to the ultrasonic generator is above each one of the rods 48, so that its body 47 extends inside the rod close to its front end. This is evident from FIGS. 10 and 11. The bar 60 is arranged in such a manner that if it is pivoted in a direction towards the rods 48 it will be directly in front of a space close to the front edge of the rods. Of the two power cylinders 62 and 63, the power cylinder 62 can be adjusted with respect to its stroke, which is determined in a manner to be described later. The cylinder 63 on the other hand is arranged to be set for a certain pressure such as by being coupled to an adjustable pressure reducing valve. All of the power cylinders are for the rest coupled to an operative system, which can be actuated by means of foot pedals 64 in the footing 42 of the frame.

The interior of the feeding device is shown in FIG. 12. In this figure it is shown how the rod 48 at its rear end exhibits a steplike termination, the long portion exhibiting a recess 65. Directly in front of the rod, an arc shaped feeding element 67 is pivotably journalled on a shaft 66, one end of said the feeding element exhibiting a steplike recess 68 with a space, which is open in a direction toward the end of the feeding element and which communicates with the periphery of the feeding element by means of an opening 69. The feeding element 67 is provided to pivot backwards and forwards slightly more than 180° between a position immediately close to the rod 48 and a position with the recess 68 pointing in downwards direction. The feeding element 67 moves in a cylindric drum. There is one feeding element 67 for each rod 48, and the feeding elements can be axially spaced.

In FIG. 13 it is illustrated more in detail how the grooves in the yokes 52 and 53 are arranged. The inner yoke 52 thus exhibits a groove 70 pointing in a backwards direction. The outer yoke 53 exhibits two grooves, a wide one 71 pointing in a backwards direction, within which groove the groove 70 has its range of movement, and a narrow groove 72 pointing in forwards direction. In the bottom position of the yokes 52 and 53, the groove 70 is slightly below the low edge of the rack 45, and the groove 71 is in the same relative position as is shown in FIG. 13. When the yokes are pulled up by means of the power cylinders 54 and 55, the grooves 70 and 72 are slightly above the lower edge of the rack 45.

As shown in FIG. 10, the bar 60 may be flat, or as shown in FIG. 11, the bar may have projecting pins 73 and one additional rod 74 with holes 75 through which the pins 73 can extend. The rod 74 by means of a power cylinder, not shown, can be displaced between two positions, in which the bar lies directly against the bar 60 with the pins 73 extending through the holes 75, and another position outside of the pins 73, as is shown in FIG. 11.

INDUSTRIAL APPLICABILITY

When the apparatus is used, it is the intention that buttons 76 with a head 77 and a stem 78 are to be fastened with the stem 78 to a piece of garment in a portion 79 of the same. After the fastening, the stem 78 shall extends through a second portion 80 of the piece of garment, so that the head 77 will be on an opposite side of the portion 80 relative to the portion 79. The stem 78 thus may extend through a button hole 81 of the portion 80. In connection with a shirt, a blouse or the like, the buttons, with their stems 78 are fastened to the underpiece of the front corresponding to the portion 79, while the stems 78 are extended through button holes 81 in the over-piece of the front corresponding to the portion 80, so that the button heads are at the outside of the over-piece. Since the fastening takes place at the extreme ends of the respective rods 48, the buttons 76 are positioned at these ends with their stems 78 extending outwardly and downwardly from the rods 48. The rods are fed from their rear end by means of the feeding element 67. The cylindric drums mentioned, in which the feeding elements 67 move, are partly filled with buttons 76, in which button heaps the feeding element moves backwards and forwards. While the feeding element is performing a number of strokes, it will by chance hit such buttons, which are in such position that they are caught by the recess 68 in the outer end portion of the feeding element and the buttons occupy the position illustrated in FIG. 12. Buttons which are not in such a position that they can be caught in this manner will be pushed aside, and the feeding element makes an idling stroke. Therefore the feeding elments must move a sufficiently great number of times relative to the consumption of buttons, so that the feed by chance will be sufficiently great in order to keep the rods 48 filled. When the feeding elements 67 are in their upper extreme end position, and a button is brought along, this button will be blown out of the feeding element and into the rod 48 by means of an air jet hitting the button from the inside, as air is supplied from a nozzle 82, which is placed approximately directly in front of the opening 69, when the end portion of the feeding element with the recess 68 is in its upper position. By the inclination of the rod 48, the buttons in the introduced position will be transported in a forward direction towards the outer end of the rods. This transportation can be facilitated by means of additional jets of compressed air or by the rods 48 being vibrated.

At the outer ends of the rods the buttons 76 are stopped by the stop plate 50 moved downwards in its normal position. In the normal position before a fastening operation is started, also the yokes 52 and 53 are in their lower positions with the groove below the edge of the rack 45.

When a row of buttons is to be fastened, the portion 80, is brought with its outer ends into the grooves 70 of the lateral portions of the yoke 52. Thereafter one of the pedals 64 is pressed down, which actuates the power cylinder 54 in such a manner that the yoke 52 will move upwards, and the piece of garment 80 is pinched between the rack and the yoke at the edges of the groove 70. The piece of garment is then held in place and stretched. If it has been introduced in the correct position, the stem 78 of the buttons 76 will penetrate through the button holes 81. Next, preferably checking by hand, the portion 79 of the garment piece is introduced into the groove 72 of the yoke 53 which still is occupying a position below the edge of the rack 45. Thereafter the second pedal 64 is subjected to pressure, whereby the power cylinder 55 is actuated pulling up the outer yoke 53, so that the portion 79 is locked by the grooves 72. When the fastening operation is taking place, the piece of garment with the portion 79 should be brought around the bar 60, so that the piece of garment when the fastened position is finished extends around the same.

The fastening step is accomplished in series by programming means when the power cylinder 51 is actuated. As a measure of safety, it is advisable to have additional operating means, preferably in the form a dual-grip releasing mechanism, which has to be operated with both hands simultaneously, which eliminates the possibility that these are in such a position that injury by pinching or the like can occur. Irrespective of the manner in which the subsequent operation takes place, the cylinder 62 is activated, which results in the bar 60 being pivoted upwards to bear against the point of the stem of the button 76, so that this point penetrates the portion 79. Next, the ultrasonics oscillator produces oscillations in the bars 47 and a simultaneous activation of the cylinder 63, so that the bar 60 with a certain pressure rests against the points of the stems. When this occurs the material of the stem 78, which is made of plastics, preferably an acetaldehyde resin, starts to yield thereby forming a head on the outside of the portion 79, which in FIG. 11 is pointing downwards. Thus the button is fastened to the portion 79. When the stem 78 is deformed, the material can reach such a condition that it amalgamates with the textile material of the portion 79, as shown in FIG. 6. To insure that a sufficiently large portion of the stem 78 is deformed to form a neck of acceptable length and a deformation head of sufficient size, the bar 74 shown in FIG. 12 may be used to aid in pressing the stem 78 through the garment portion 79.

When all of the buttons 76 have been fastened, which, thus, takes place in one single working operation, the yokes 52 and 53 are moved downwards, so that the piece of garment will be free, while the stop plate 50 is lifted upwards, so that the ends of the rods 78 are opened up. Thereafter the buttons are extracted from the rods and the stop plate 50 is again moved downwards in order to retain the next batch of buttons. When the piece of garment is removed, the bar 60 should be lowered, and the now buttoned up piece of garment can be taken off the bar via its free end. These operations, which take place after the fastening operation, are programmed to be performed in a suitable sequence.

Thus, the method to fasten the button comprises the following principal steps after the piece of garment has been finished by sewing and the button holes have been made:

I Placing the buttons in the intended formation in a holder with the projections thereon extending in outwards direction from the holder:

II placing the one portion of the piece of garment, which is provided with the button openings, on the holder in such a manner that the projections of the buttons are extending out through the button openings and with the respective main portions of the buttons placed on the same side of said portion of the piece of garment as they are intended to occupy in a buttoned up piece of garment;

II joining of the projections of the buttons with the portion of the piece of garment to which the buttons are to be fastened with the portion provided with button openings between the main portion of the buttons and said portion where the buttons are fastened. The steps a-c previously recited are performed; and IV removal of the piece of garment from the apparatus.

The foregoing describes how the process is to be carried out by means of the apparatus. In that connection the principal function of the apparatus has been evident. However, this principal function can also be reached in ways other than the one described. Thus, a great many types of feeding devices for small objects are known, by means of which devices the parts, in this case the buttons, can be brought directly in front of a working position in a predetermined orientation. In the prior art a vibrating chute is utilized, in which the small parts in a random manner are given a forward feed by vibration and thereby meet certain traps, which move aside incorrectly oriented parts. Such a device can be used instead of the feeding device illustrated in FIG. 12. Also the means for holding the piece of garment in place can be designed in may ways, however, it should preferably comprise some kind of pinching means and some kind of stretching means. The apparatus can of course be enlarged to permit the fastening of several rows of buttons at the same time, its function being substantially the same as has been described.

I claim:

1. A method of fastening a button or the like to a garment such that the garment will be buttoned up after the fastening operation, wherein said button is composed of plastic and initially comprises a button head and a stem projecting from the button head, the stem having an outer end for piercing the garment and for deformation by ultrasonic vibration, a central section characterized by a substantially smooth profile, and an inner section flaring into the button head, the method comprising the steps of:

providing a button hole in a first portion of the garment;

placing said first garment portion in an overlying relation with a second portion of the garment;

positioning said button such that the button head is disposed on the side of said first garment portion opposite to said second garment portion and such that the stem extends through the button hole and pierces at least partly through said second garment portion; and deforming the outer end of the stem by ultrasonic vibration thereof.

2. A method of fastening a button or the like to a garment such that the garment will be buttoned up after the fastening operation according to claim 1, wherein the stem is provided with a shoulder section between the outer end thereof and the central section thereof.

3. A method of fastening a button or the like to a garment such that the garment will be buttoned up after the fastening operation according to claim 1, wherein said garment comprises a textile material having threads, and whereby the stem tears some threads of the textile material upon piercing at least partly through said second garment portion.

4. A method of fastening a button or the like to a garment such that the garment will be buttoned up after the fastening operation according to claim 3, whereby some ends of the threads so torn are intertwined into the stem outer end during and after the deformation thereof.

5. A method of fastening a button or the like to a garment such that the garment will be buttoned up after the fastening operation according to claim 4, wherein the stem outer end is provided with substantially sharp cornered edges for aiding the tearing of the threads.

6. A machine for fastening a button or the like to a garment such that the garment will be buttoned up after the fastening operation, wherein said button initially comprises a button head and a stem projecting from the button head, and wherein said garment comprises a first portion provided with a button hole and a second portion, the machine comprising:

means for placing said first garment portion in an overlying relation with said second garment portion;

means for stretching both garment portions;

means for positioning said button such that the button head is disposed on the side of said first garment portion opposite to said second garment portion and such that the stem extends through the button hole and pierces at least partly through said second garment portion; and means for ultrasonically vibrating the portion of the stem piercing at least partly through said second garment portion such that said stem portion deforms.

7. A machine for fastening a button or the like to a garment such that the garment will be buttoned up after the fastening operation according to claim 6 further including means for feeding additional buttons to said button positioning means.

8. A machine for fastening a button or the like to a garment such that the garment will be buttoned up after the fastening operation according to claim 7, wherein said button feeding means and said button positioning means include a rail for guidedly transporting and guidedly holding a button.

* * * * *